(No Model.)
C. W. & L. B. ATKINSON.
CUTTER OR DRILL FOR COAL.
No. 482,033. Patented Sept. 6, 1892.
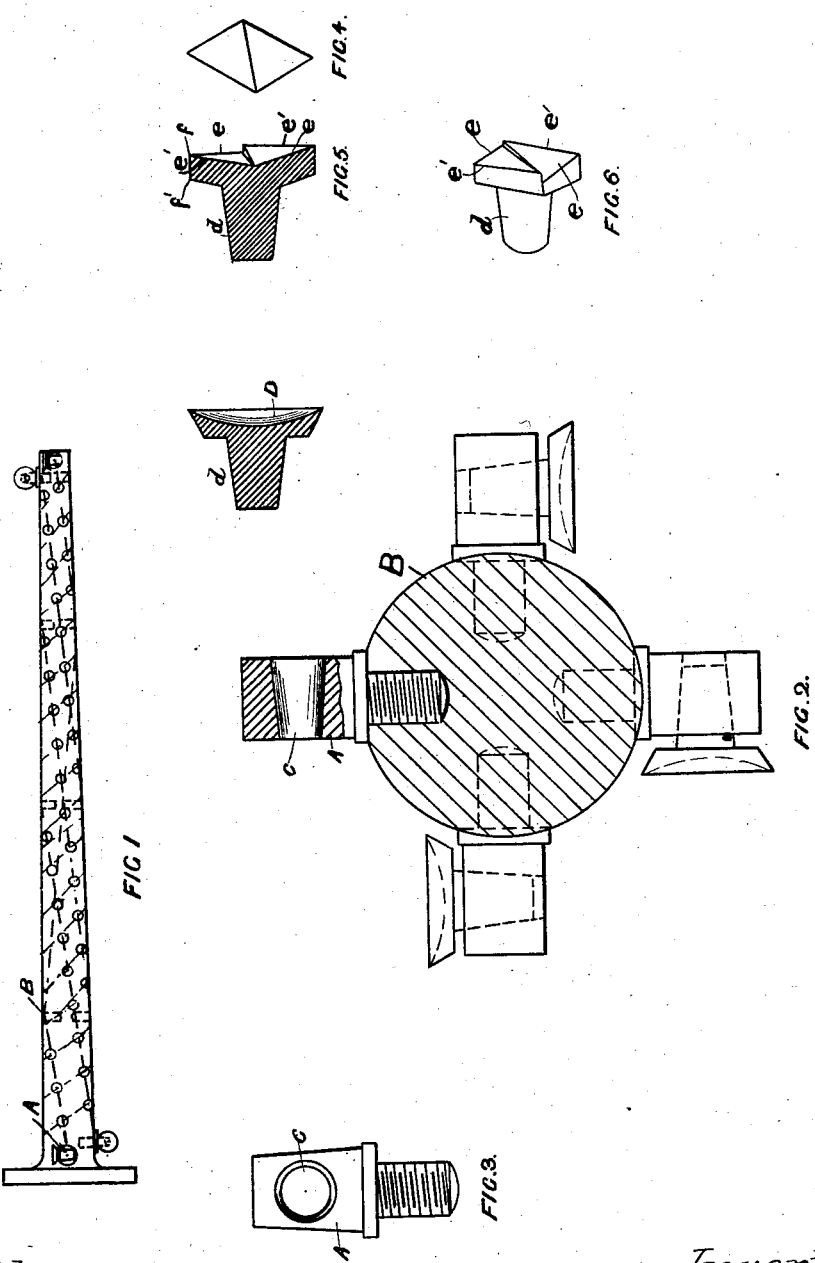

UNITED STATES PATENT OFFICE.

CLAUDE WILLIAM ATKINSON AND LLEWELYN B. ATKINSON, OF LONDON, ENGLAND.

CUTTER OR DRILL FOR COAL.

SPECIFICATION forming part of Letters Patent No. 482,033, dated September 6, 1892.

Application filed August 18, 1891. Serial No. 403,025. (No model.)

*To all whom it may concern:*

Be it known that we, CLAUDE WILLIAM ATKINSON and LLEWELYN BIRCHALL ATKINSON, civil engineers, subjects of the Queen of Great Britain and Ireland, residing at London, England, have invented Improvements in Cutters or Drills for Coal, of which the following is a specification.

This invention relates to improvements in cutters or drills applicable to coal or other materials either in the form of a cutter-bar in which the cutters are disposed along its length or in the form of a disk, the cutters being arranged around the periphery of the disk for the purpose of cutting a deep slot in the face of the material, or in cutter-bars used for the purpose of forming circular holes in the same.

In such cutters or drills as have been heretofore made the material forming the cutting-edge has been supported in the bar, disk, or mandrel in one piece—that is to say, a considerable portion of the cutting-tool has to be embedded into the bar which holds it, thereby entailing a heavy outlay when the cutters are new and little or no return to be obtained for worn-out cutters. Consequently the largest proportion of the material of the cutters is thrown away.

We have described a cutter or drill in another application of even date herewith in which the cutters are formed of separate pieces of steel of a taper form, mounted so as to be frictionally held in a special disposition upon a mandrel capable of revolution.

In order that our invention may be the better understood, we will now describe the same in relation to the drawings hereunto annexed, reference being had to the letters marked thereon, the bar of the taper form, as before referred to, being used for the purpose of description, so as to show one method of carrying out our invention.

Figure 1 is a side view of a cutter-bar with tool-holders and tools attached. Fig. 2 is a section of the bar, showing a tool-holder partly in section and the tool in section removed therefrom. Fig. 3 is a view of the tool-holder removed from the bar. Figs. 4, 5, and 6 are views of a modified tool.

In place of the steel cutters formerly used we substitute a cutter-holder A in the form of a projecting shank, which is mounted upon the cutter-bar B, preferably by screwing it into the same; but it may be attached by forming the shank-taper so as to be frictionally held in the bar in a similar manner to the cutters before described. One great advantage, however, of screwing these holders A into the bar B is that a great reduction is effected in the amount of material of the bar that has to be removed for the purpose of attaching the cutter. At the outer end of this shank or holder A the hole C is arranged, which in the case of a cutter-bar for cutting a deep slot in the face of the coal or other material, will be at right angles or about right angles to the axes of the holder and bar. This hole C may be round, square, polygonal, parallel, (uniformly cylindrical throughout,) or taper; but we prefer to make it round and taper in order to facilitate the attachment and detachment of the cutter therewith.

The cutter D may be made of varying shapes to suit the material to be cut, and is mounted in the hole C at the end of the holder A in such a way that the pressure produced by cutting tends to force it tighter into its holder. The cutters, as shown in Figs. 1 and 2, are of a circular cupped form, having a taper shank *d*, which engages with the taper hole C in the holder A. The tool is so shaped, or the hole is so inclined, if necessary, as to allow the cutting-edge to project radially beyond the shank A. The great advantage of this circular-cupped tool is that as one part of the circumferential cutting-edge becomes worn away the cutter can be withdrawn from its holder A and turned, so as to present a fresh cutting-edge to the material to be cut until the whole circumference has been worn away.

In Figs. 4, 5, and 6 we show a form of cutter having two cutting-edges only, the cutter being of the diamond shape and having a taper shank *d* to attach it to the holder. The front face of each half of the cutter is ground off at an angle, so that the cutting-edge *e* leads a trifle in advance of the edge *e'*. When the one side of the cutter has become worn, the cutter is knocked from its holder and the cutting-edges turned end for end.

A very high efficiency of cutting effect is obtained with the diamond-shaped cutter if the holder A is so adjusted upon the bar that the point $f$ of the cutter, Fig. 6, revolves in a different plane of revolution to the point $F'$. The effect of this is that the point $f$ cuts a groove in the coal and the edge between $f$ and $f'$ breaks off the coal between one groove and another, the result being that the actual amount of coal that is cut is very small, the majority being broken off and the power required for driving the machine is consequently much reduced. It is obvious that this method of mounting the cutters is considerably cheaper than those used heretofore, as the amount of cutting-edge material used in the bar is reduced very considerably—say to about one-twentieth of that used where the cutters are mounted in the bar direct—and, further, as before described, when the cutting-edge has become blunt it can be turned about its axis, offering a fresh cutting-edge, and also when the cutting-edge has been completely used up it is cheaper to knock it out and to insert a fresh cutter rather than grind the old one. These cutters may be made of chilled cast iron or steel; but we prefer to use the former, as being considerably cheaper.

As shown in Fig. 1 it will be noticed that the tool-holders A are arranged upon the bar in double spiral form—that is to say, one way on a left-hand spiral of large pitch, say once the length of the bar and about four spirals, and the other a number of right-hand spirals of short pitch. The holders are placed on the intersection of a left-handed spiral long pitch and right-handed intersecting short pitch, as shown in Fig. 1. One dotted line without holders on it represents the long-pitch line at the back of the bar.

The cutters are arranged on the short-pitched right-handed spiral to give a feed backward toward the flanged end of the bar to the débris of coal from the cutter. If the cutters were further arranged on the longitudinal axial lines, all the cutters on such a line would engage with the coal stratum simultaneously, and when an especially hard layer of shale or conglomerate were struck the concentrated resistence of the obstructions upon the whole line of cutters would tend to stop the machine or to give a heavy jar thereto. By arranging the cutters on the intersections of a left-handed spiral pitch of equal length of the bar the cutters only engage successively upon the working face of the cut and the resistance to cutting is distributed over the entire rotation of the bar.

It is obvious that our invention is equally applicable to tools for purposes of face-cutting, such as that required for drilling a hole of four inches or any other dimension, in which case we arrange one or more of the cutters, as before described, on the cutter-bar, the end of the bar being supported in a small hole previously made. The cutters and their holders are so arranged in respect to the bar that they cut out an annular groove or grooves about the axis of rotation.

Having now particularly described and ascertained the nature of our invention and in what manner the same is to be performed, we declare that what we claim is—

1. In a cutter bar or drill for coal or other minerals, the combination, with a cylindrical bar, of a series of tool-holders arranged at and fitted into holes in the intersections of right and left handed spirals of different pitch, one with pitch the length of the bar and the other intersecting spiral with a pitch of about one-tenth the length of the bar, substantially as set forth.

2. In a cutter bar or drill for coal or other mineral, a diamond-shaped cutting-tool with a taper shank detachably attached to a holder A, in combination with a revolving bar supporting the said holders, the cutter being so disposed in the holder and to the bar that the front and back corners of the cutting-edge rotate in different planes of revolution, substantially as and for the purpose specified.

In testimony whereof we have signed our names to this specification in the presence of two subscribing witnesses.

CLAUDE WILLIAM ATKINSON.
LLEWELYN B. ATKINSON.

Witnesses:
TOM M. TULEY,
CHARLES F. ARROWSMITH.